United States Patent [19]

Haronian et al.

[11] Patent Number: 5,248,899
[45] Date of Patent: Sep. 28, 1993

[54] NEURAL NETWORK USING PHOTOELECTRIC SUBSTANCE

[76] Inventors: Dan Haronian, P.O. Box 1405, Efrat, Israel, 90962; Aaron Lewis, 18/14 Neveh Shaanan, Jerusalem, Israel, 93707

[21] Appl. No.: 832,912

[22] Filed: Feb. 7, 1992

[51] Int. Cl.$^5$ .............................. G06F 15/46
[52] U.S. Cl. ......................... 307/201; 395/25
[58] Field of Search ..................... 307/201; 395/25

[56] References Cited

U.S. PATENT DOCUMENTS

| | | | |
|---|---|---|---|
| 4,660,166 | 4/1987 | Hopfield | 307/201 X |
| 4,874,963 | 10/1989 | Alspector | 307/201 |
| 4,977,540 | 12/1990 | Goodwin et al. | 307/201 X |
| 4,994,982 | 2/1991 | Duranton et al. | 307/201 X |
| 5,130,563 | 7/1992 | Nabet et al. | 307/201 |

OTHER PUBLICATIONS

Bushor, "The Perceptron-An Experiment in Learning" *Electronics,* Jul. 1960, pp. 56-59.
Joseph, "On Predicting Perceptron Performance" IRE Center Convention, no date given.

*Primary Examiner*—David R. Hudspeth
*Attorney, Agent, or Firm*—Jacobson, Price, Holman & Stern

[57] ABSTRACT

A neural network, and a method of storing information and retrieving it by such network. The network comprises neurons, synapses and switches, and when required also rectifying means. The network is based on a substance which undergoes a reversible change from stable state A to stable state B, and this substance can also be changed from state A to another state C, which change is also reversible, where each change provides a measurable electrical pulse. The change of state is brought about by means of illumination for a predetermined period of time at a certain wavelength, it being possible to convert a desired part of the substance from one state to the other.

21 Claims, 18 Drawing Sheets

INITIAL

WRITING

READING

FIG. 8
| COLUMN OF SYNAPSE CONNECTED TO Ni \ Ni | 1 | 0 |
|---|---|---|
| Tij | 1*Tij | 0 |
FIG. 9A
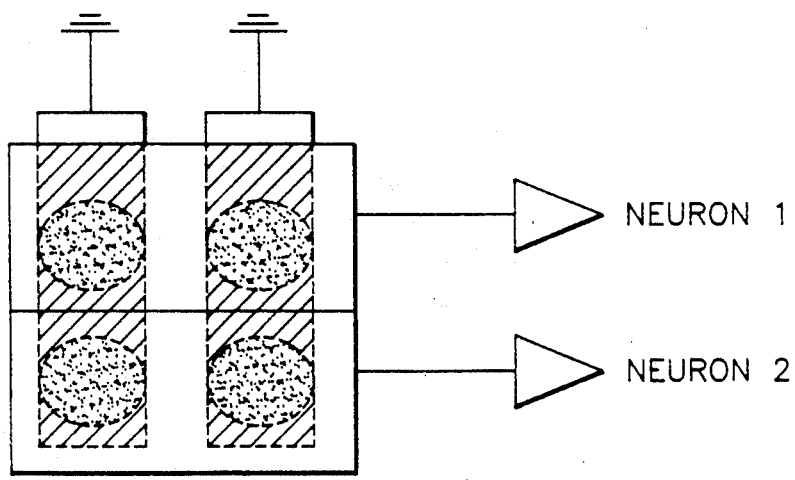
FIG. 9B
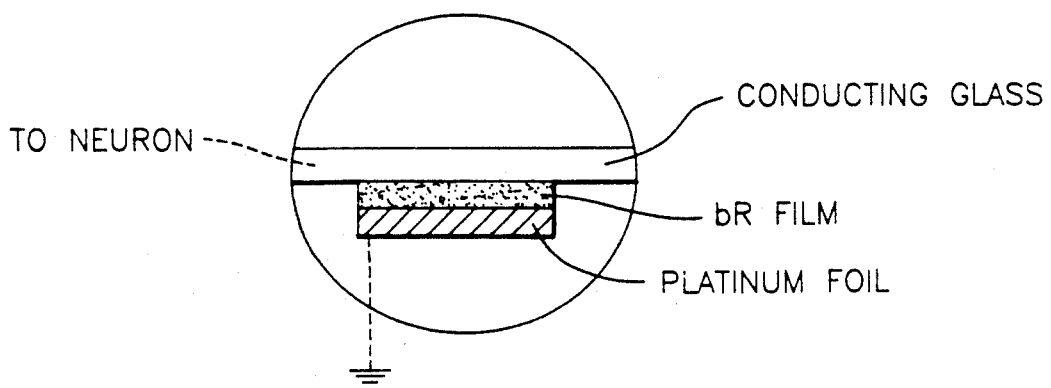

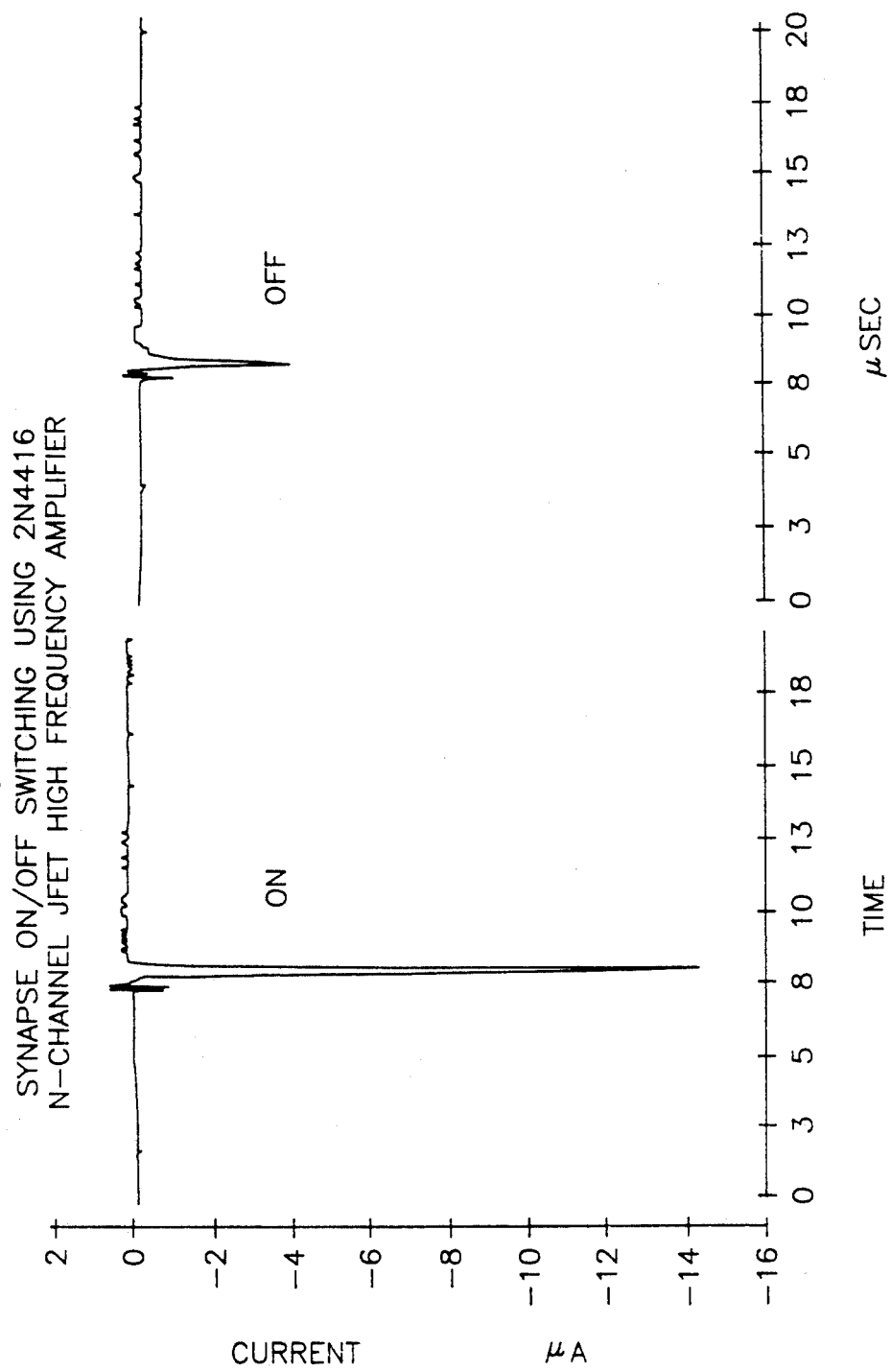

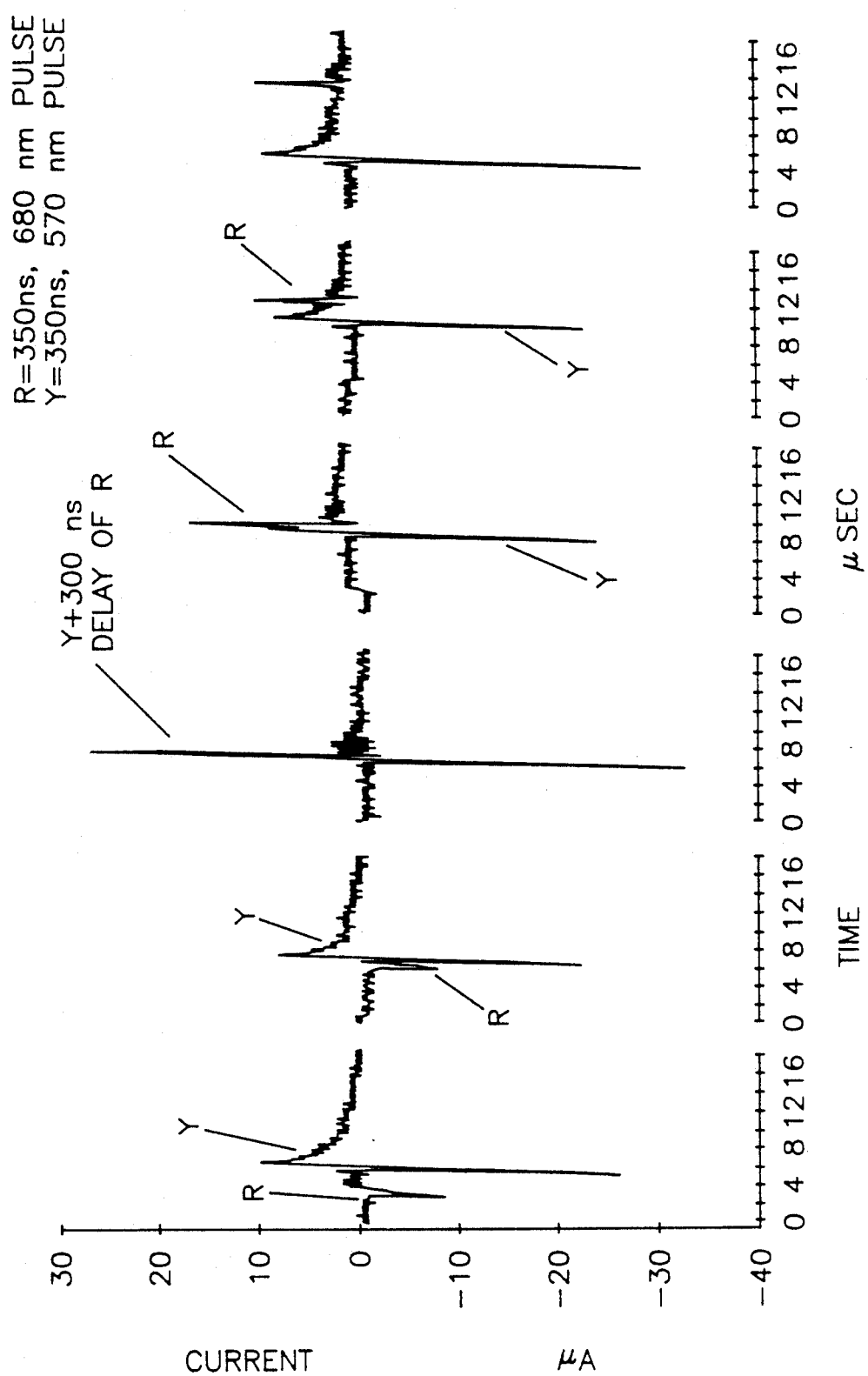

NEURAL NETWORK USING PHOTOELECTRIC SUBSTANCE

BACKGROUND OF THE INVENTION

The invention relates to a novel neural network architecture implemented with materials that exhibit photoelectrical signals with characteristics similar to the molecule bacteriorhodopsin and related pigments. This unique neural network architecture uses such materials to implement a reprogrammable, highly parallel synapse matrix activated by light where, unlike other implementations, the current source lies in the synapse itself.

An additional essential feature of these types of materials is the ability to read in parallel with light a matrix of a certain molecular state without erasing such state.

Neural networks have been studied for many years as models for understanding information processing in the human brain. These studies have led researchers to see the potential of performing various artificial intelligence tasks with such associative memories. However, the technical implementation of neural networks is limited due to the absence of efficient and reliable hardware realizations of neural networks. This difficulty arises from the fundamental principles of neural networks which emphasize that massive parallel networks are needed for effective implementation of these powerful computing machines. The need for millions of reprogrammble pixels connected and activated in parallel is hard to obtain with common microelectronics hardware.

Basically the use of an electrooptic approach is more effective than the common methodologies of microelectronics when parallel behavior is needed. This is so because a light beam can act as a parallel activator of a network of connections.

Electronic and elecrooptic hardware implementations of neural networks have been reported (3-5). These implementations use microresistors or photoconductive elements to implement the synapses matrix. These elements are activated to produce a binary state in each synapse. The dimension of these elements is in the range of 30-100 microns and the use of binary logic decreases programming capabilities of the network. In addition, the complex activation of such networks and the limited reprogrammability is cumbersome. Thus these factors restrict the development of effective neural network devices.

SUMMARY OF THE INVENTION

The invention relates to an implementation of neural networks with materials having photoelectrical characteristics similar to the membrane protein bacteriorohodopsin (bR). The use of such materials with molecular electooptic characteristics for the implementation of the synapse matrix of neural networks makes it possible to increase the density of information stored and thus, reduce the required dimensions. In our implementation each synapse is composed of a substance having bR molecule that have bistable optical and electrical characteristics. Transition from one stable state to a second stable state produces a photocurrent and absorption effects. As will be demonstrated the network can be programmed (the writing step) and read in parallel with light without erasure of the information stored in the synapses. An interesting difference between our architecture of a neural network with bR and conventional neural networks in which resistors are placed at the synaptic terminals is the source of the energy that runs the network. In conventional systems the energy comes from the voltage supplied by the neuron while according to the Invention it comes from the reprogrammable current source, that is the bR molecules in the synapse.

BRIEF DESCRIPTION OF THE DRAWINGS

FIG. 8 is a neural network truth table.

FIG. 9A illustrates a four synapse sample of a neural network in accordance with the present invention.

FIG. 9B is a cross section of one of the four synapses illustrated in FIG. 9A.

FIG. 11 is a graphic representation of the open-circuit and closed-circuit photocurrents for a single synapse.

FIG. 14 graphically illustrates the photocurrent response during a "read without erase experiment".

DETAILED DESCRIPTION OF THE PREFERRED EMBODIMENTS bR Characteristics

Bacteriorhodopsin (bR) is a pigmented protein which is found in the purple membrane of the bacterium Halobacterium halobium. The purple membrane is the only known crystalline membrane found in nature and the bR molecule is a protein found in the purple membrane. The principle role of bR is to operate as a light-driven proton pump which is activated by light in a wide band around 570 nm. As a result of excitation by light the bR molecule undergoes cyclic molecular transformations which result in a proton being pumped from the inside to the outside of the bacterium (see FIG. 1). At least six of these transformations have been detected as color changes in the vitamin. A related pigment, retinal, which is covalently linked to the bR protein. For the investigations reported herein, it is important to note that these transformations are also associated with the production of charge transitions across the membrane. The earliest of these transitions is observed with the rise of one of the first detectable intermediates, K, which is produced on a picosecond time-scale. It is generally believed that with improvements in instrumentation to detect rapid electrical signals even the very first intermediate J, which is produced in 450 fsecs also will be associated with such charge movements.

We focus our attention on the nature of these charge displacements and relate our observations to a unique neural network architecture devised by us to provide for rapidly reprogrammable, high density neural networks.

Stable bR Images

One of the unique properties of bR that is alluded to above is the ability for the optical and electrical properties of bR membranes, specially treated with borate buffer, to store information indefinitely at close to room temperature. To demonstrate this storage of information in these membranes a drop of borate buffer is placed on dried bR which was oriented in an electrical field by the procedure of Varo' (6). With this simple methodology there are obtained a completely erasable and oriented bR films that have been used to impress a variety of words and symbols with high resolution (see FIG. 2). In producing these room temperature images on a single film of purple membrane those bR molecules that absorb the yellow (570 nm) light create a charge transition which can be detected, with an appropriate electrical circuit, as a photovolatage or a photocurrent. Thus, in the image of a grid seen in FIG. 2 the yellow (light) squares are the regions where bR has been transformed to M and these are the regions that produce photoelectrical signals while they were written. The M state molecules in the image can be "erased" with blue (412 nm)light which produces a photoelectrical signal with the reverse orientation.

bR Electrical Characteristics Central to Neural Networks

Figure 3A:
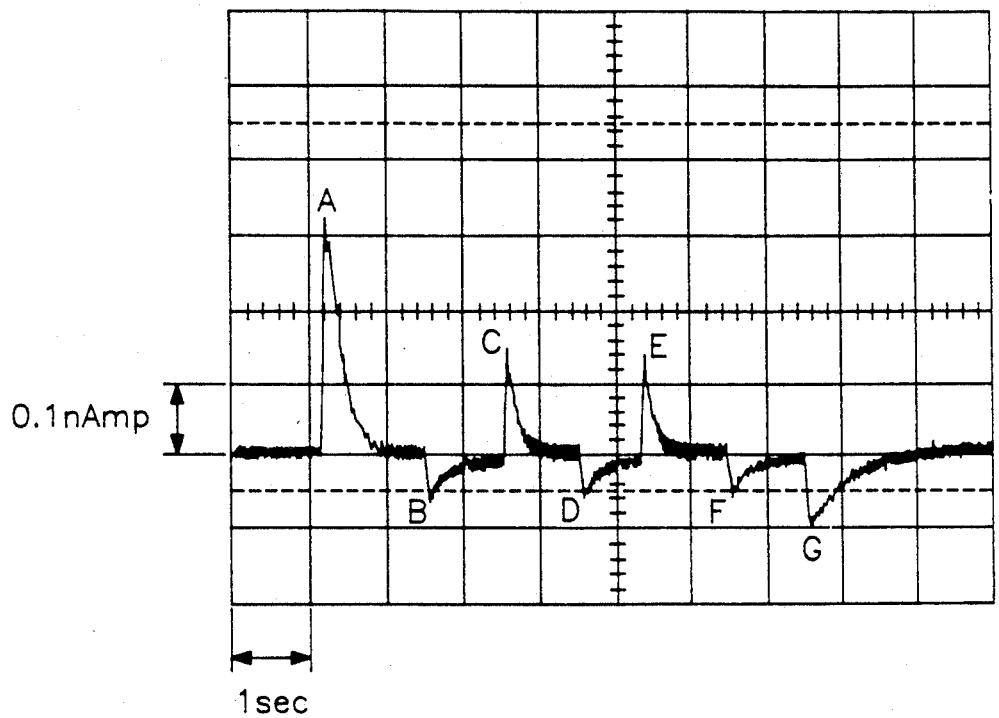
FIGS. 3A and 3B are graphs illustrating photocurrents during bR to M transitions and M to bR transitions.

To demonstrate the electrical effects crucial in the formation of our neural network architecture we present data with a simple cell containing oriented dried bR treated with borate buffer and sandwiched between conducting glass and a platinum electrode. The results from this cell are shown in FIG. 3. In this figure we show the voltage developed by the photocurrent flowing through a 1 Gohm resistor. In FIG. 3A is a trace of the electrical response in going from bR to M and M to bR as a function of time after the first 570 nm pulse of light. The peak labelled A is the initial response to the yellow light by a film that is completely in the bR state. Peak B in this figure is a back reaction in the dark of M molecules produced in 1. Peak C is the response of bR to an identical second pulse of 570 nm light. The response to this flash is much smaller because most of the molecules are stable in the M-state. After another dark period which sees some fraction of M molecules returning to bR and producing peak D, a third identical 570 nm flash illuminates the sample. The similar intensities of peaks C and E, and for that matter B and D, could be due to a fraction of bR molecules that have not been exposed effectively to the borate buffer and are responsible for the repeatable transitions between M and bR and bR and M. Finally, peak G is due to blue (412 nm) illumination of the film sandwiched between the electrodes which sends all molecules in M back to bR.

Figure 3B:
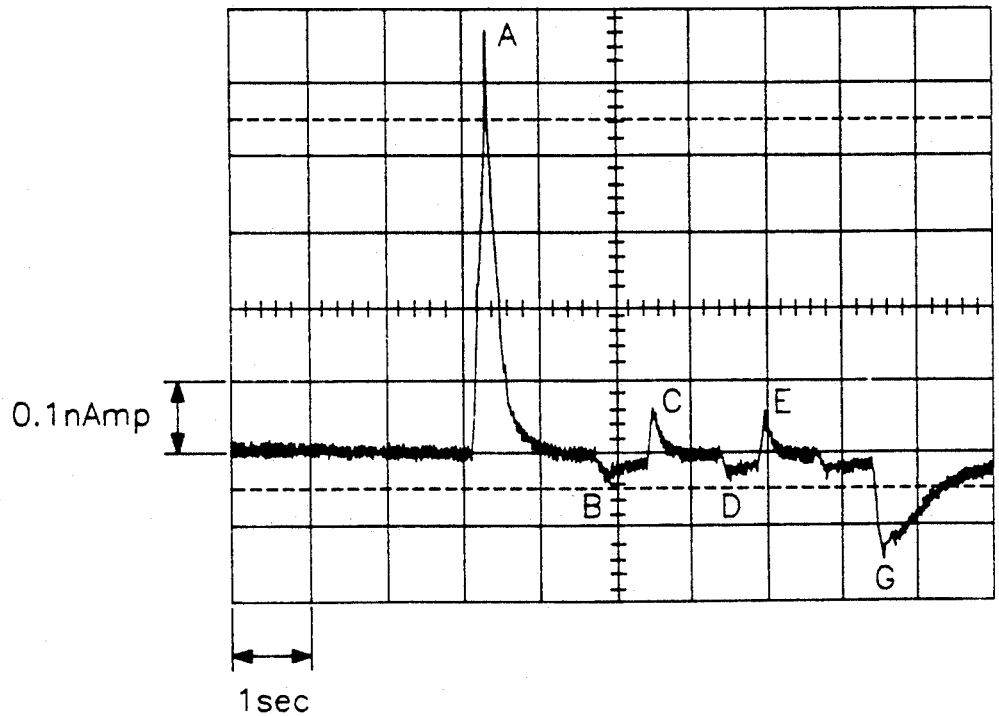

The effect of cooling to 4° C. on this same sequence of illuminations is seen in FIG. 3B. Here we note that the peaks corresponding to B and C and D and E are considerably weaker. If these peaks correspond to a cyclable fraction of non-borate exposed molecules then the reduction in their intensity is understandable since lower temperatures will drastically effect this fraction which is not stabilized at room temperature. Under these conditions, as a result of the combined results of borate and temperature, M becomes much more stable.

In summary, it has been shown that the bR film is an electrooptic molecular medium with a memory that is erasable. In addition the molecular characteristics of this medium can be selectively addressed with the appropriate choice of light pulses to stimulate either bR or the intermediate M. In principle the optical and electrical information can be stored in a pixel composed of a single molecular unit or a plurality of such units, depending on the system resolutation. We show these memorizable absorption and electrooptical characteristics of the bR films and demonstrate how they can be integrated to develop a novel neural network architecture. The optical properties of the bR film can be protected through repeated reading steps of the bR neural network and the values of the synaptic strengths of the network can be varied in an analog fashion between 0 and 1.

bR neural Network Architecture.

Light absorption by bR molecules changes the bonds in the molecule and produces an electrical response due to a charge displacement in the molecular matrix. As a result of this change in the position of the charge, there is an alteration in the absorption of the bR molecules and during this charge transition one can measure photocurrent signals. Illumination of the molecules with appropriate light produces both color alterations and photocurrents. Therefore, this material is a bistable element.

The procedure of activating the bR synapse matrix comprises a writing step and a reading step.

The Writing Step

During the writing step information is stored on the synapse matrix while during the reading step this information is read. The writing step is preformed by sending part of the molecules in each synapse from bR to M. Thus, during the writing step of the synapse matrix different amounts of molecules in each synapse are transferred by the writing light pulse to the M state. In essence, the fraction of bR and M at each synapse could be some variable function which can be expressed by $a_{ij} + b_{ij}$, where $a_{ij}$ and $b_{ij}$ are the number of bR and M molecules respectively with their sum equal to the number of bR and M molecules at each synapse ij. However in these experiments we employed either all bR or all M molecules for convenience.

The Reading Step

In the reading step, with the presence of no external sources, such as light, voltage, current etc., the whole assembly was excited with a uniform pulse of 570 nm light. Under these conditions each synapse produced a photocurrent depending on the bR, M composition impressed in the writing step. Thus synapses connected to the same neuron produce photocurrent determined by aij that are summed up to give a result for one neuron.

Reading without Erasing

The multiple states of the bR photocycle make possible reading the neural network without erasing the information stored at the synaptic matrix. In order to appreciate this approach it is important to recall that the bR to K transition has a photocurrent associated with it that is of the same order of magnitude as the bR to M transition. Whereas bR absorbs in the yellow and M absorbs in the blue, the K-state molecules absorb in the red. Coupled with the ability to stabilize the M intermediate, a method is provided to read the synaptic matrix without erasing it. The method involves modulating the concentration of bR in each pixel by producing M species in the writing step that are stable in time, and then reading the synapses with two time delay pulses where the first is in the bR absorption and the second in the K absorption. The first pulse stimulates the bR to K transition and the bR to K photocurrent with the bR molecules remaining at each synapse where the second pulse in the red (within the K absorption) generated with the appropriate time delay converts all of the K-state molecules produced, back to bR (see FIG. 4).

Figure 4A:
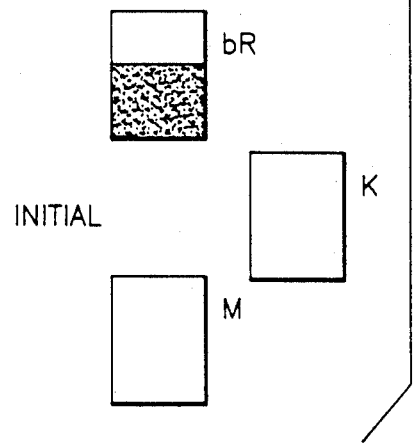
FIG. 4 illustrates the photochemical steps which occur using a "read without erase" procedure.
Figure 4B:
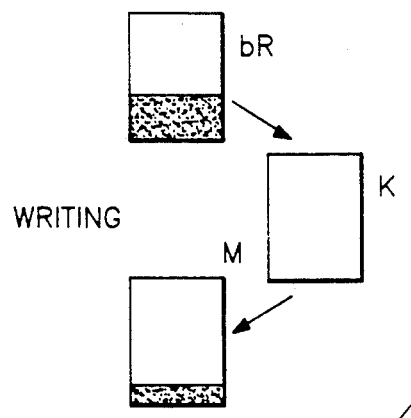
Figure 4C:
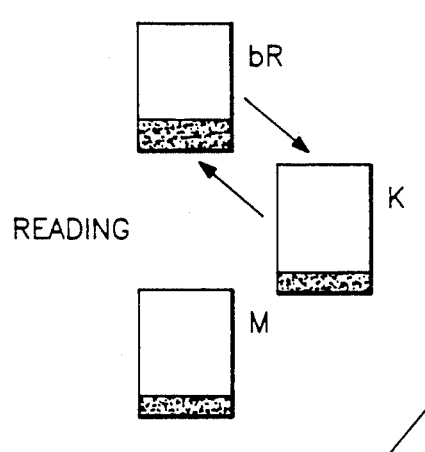
Figure 4D:
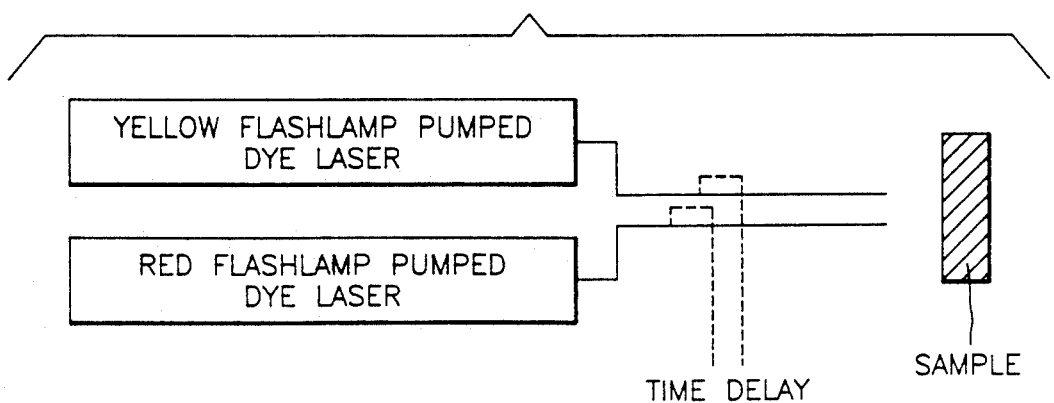

FIG. 4B shows how some of the molecules are transformed in the writing step to the M-state. The reading is diagrammatically displayed in FIG. 4C in which a pair of time-delayed laser pulses illuminate the sample. The first 350 nsec pulse in this sequence at 570 nm is followed by a 350 nsec, 680 nm pulse. The first 570 nm pulse excites bR molecules, transfers these to the K-state and generates a photoelectrical signal due to charge transitions excited by the photon. The second 680 nm pulse in the red tail of the K absorption is sufficiently far from the bR absorption to preferentially excite the molecules, reaching K. This returns the K molecules to the bR-state. Such a two pulse procedure coupled with the unique sequence of intermediate absorptions that is characteristic of all rhodopsins allows for reading the network without significant alteration in the M concentration which would erase the information.

Up to this point we described the alteration in the synaptic strengths Tij by altering the states of bR. The organization of molecules like bR as the synapses of a matrix can readily be implemented by placing a film of bR between an orthogonal set of gratings (see FIG. 5). This places bR at the crossing points of the wires.

Figure 6A:
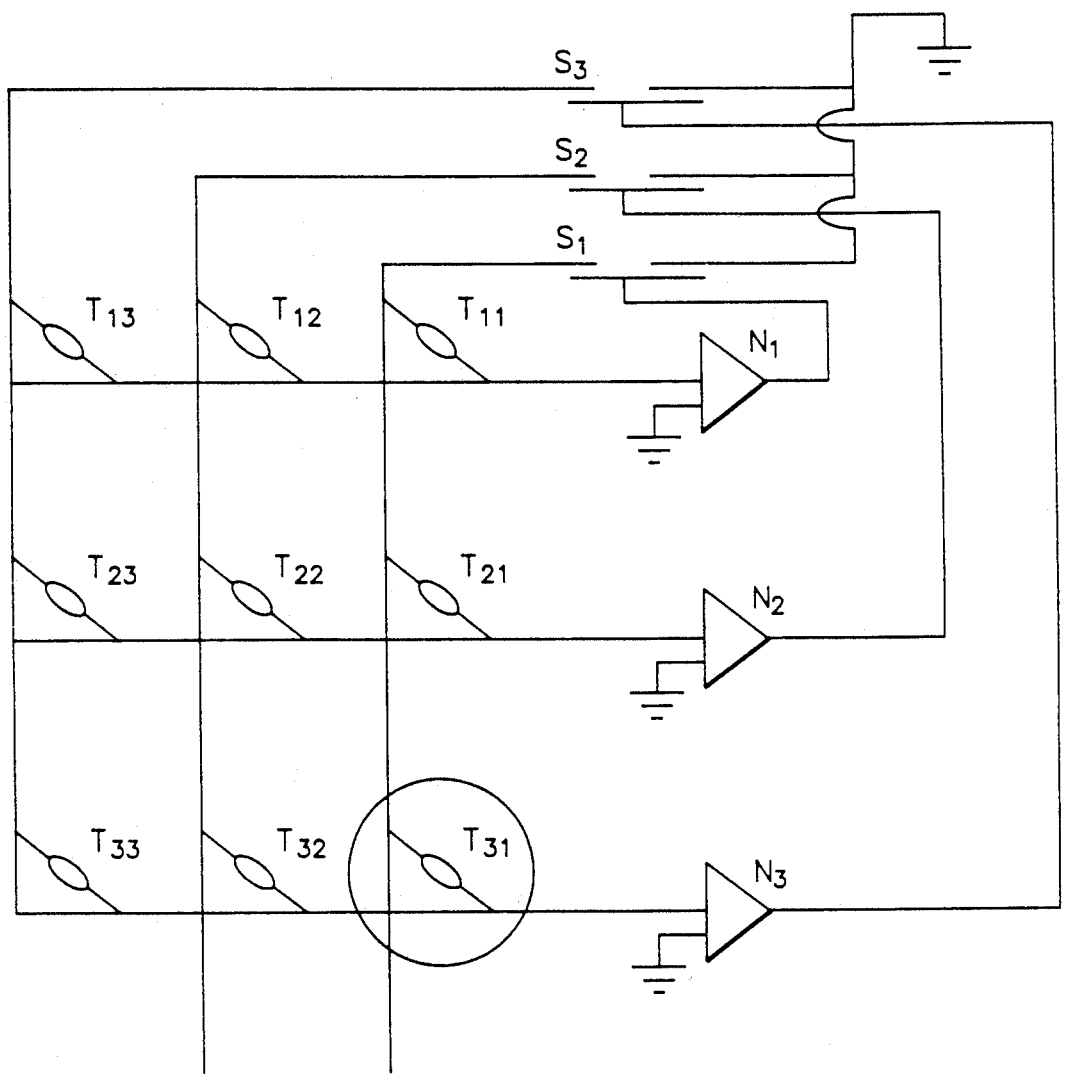
FIGS. 6A and 6B illustrate a neural network in accordance with the present invention.
Figure 6B:
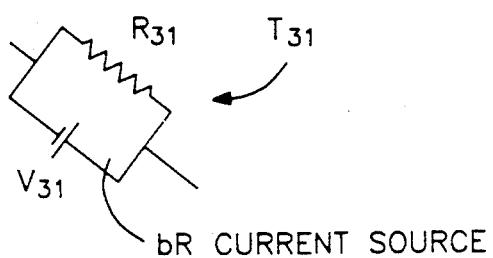
Figure 7A:
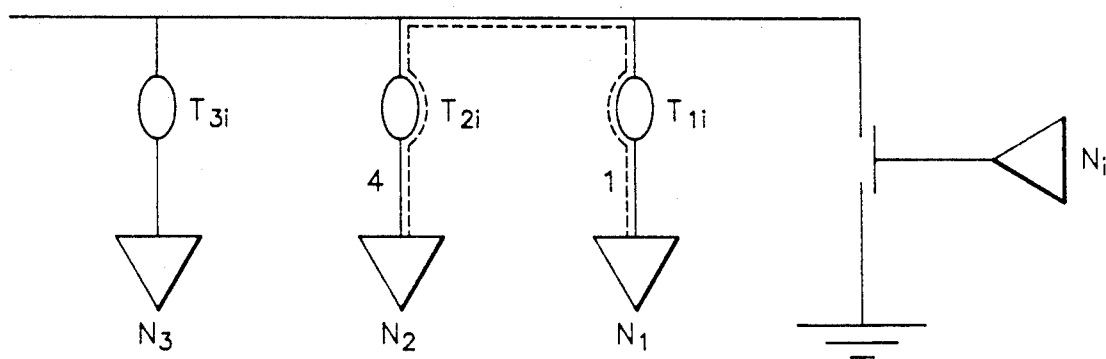
FIG. 7A illustrates the output connections from a neuron Ni.
Figure 7B:
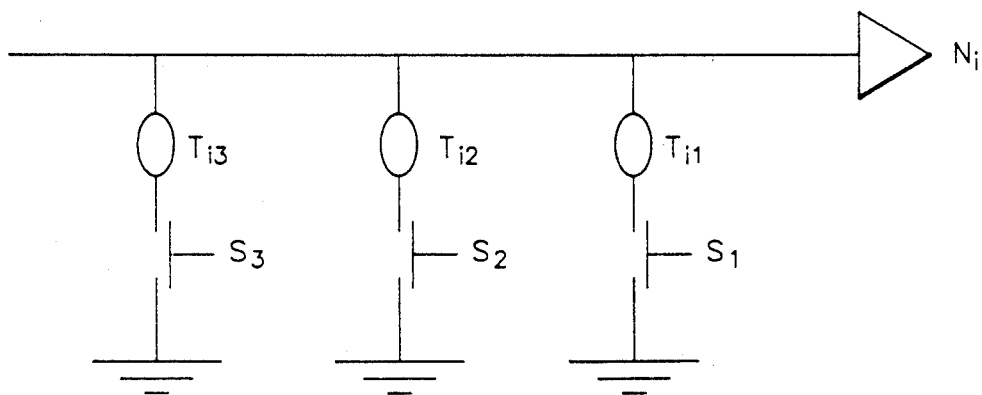
FIG. 7B illustrates input connections to the neuron Ni.

To activate the neural network we either connect a column of synapse to a closed circuit or disconnect it from a closed circuit. This control of switch Si is accomplished through neuron Ni. This is described in FIGS. 6A and 6B. When switch Si is closed, each synapse in each column is connected at one side to the ground and at the other side to a neuron which is the virtual "ground" of the neuron. Thus, depending on the program state, each of these synapses will produce a photocurrent which will contibute to the photocurrent flowing in the neuron for that particular row. Thus, each synapse in this column is placed in a closed circuit. On the other hand, when the switch Si is open these synapses are placed in open circuits and thus no matter what photocurrent should be generated due to the writing step, no electrical effect will be detected. The effect of opening and closing the circuit for a single synapse will be described in section 7.2. FIG. 7A shows the effect of switch Si on the column of synapses connected to it and FIG. 7B shows the effects of such switches to a row of synapses. The actual implementation of these effects has been accomplished for a bR matrix in which we were able to demonstrate the truth table of neural networks seen in FIG. 8.

One difficulty uncovered in this scheme is the presence of cross-talk in the column when the switch Si connected so that it is open. In all such cases the current flows from the neuron to the ground through the closed switch. When the switch is open the current from synapse in the column with the open switch will flow to the neurons through another synapse in this column resulting in cross-talk. The problem of the open switch cross-talk is readily overcome, as described in the Experimental Results below, by including a diode with a direction as shown in each of the synapses. This prevents a current arising from a synapse to flow through other synapses towards the neurons. There are also other approaches to resolve this problem.

Amongst possible embodiments of the present invention there are:

Synchronic Updating

According to this embodiment the neurons are updated in parallel (at the same time) and as a result of such parallel updating cross-talk appears through the synapse and between neurons and this requires the introduction of rectifying means, such as a diode for each synapse in order to prevent such cross-talk.

Asynchronic Updating

According to this embodiment of the invention the neurons are updated serially either by a predetermined path or at random. According to this method the synapse connected to a certain neuron are connected only when this neuron is updated and thus, in this case, the other synapses to the other neurons are not connected and no cross-talk appears, so no diodes are needed. In this embodiment one switch placed in the input of the neurons can disconnect it from its associated synapse.

Advantages Over The Prior Art

Most implementations of neural networks have several defects that are typical to neural network hardware. Generally, one can divide these defects into four types:

a) The lack of reprogrammability which prevents alterations in the synaptic strength;
b) Lack of flexibility in programming the network. This includes the fact that each synapse can only be programmed to a strength of either zero or one;
c) Low information density, which means large dimensionalities in the synapse matrix;
d) Poor flexibility in writing and reading of the information, which specially refers to the need for spatial light modulators, masks for each different piece of information stored in the synaptic matrix and in general massive optical equipment.

Our architecture addresses all these problems and solves them.

Experiment Results

Materials and Methods

Figure 10:
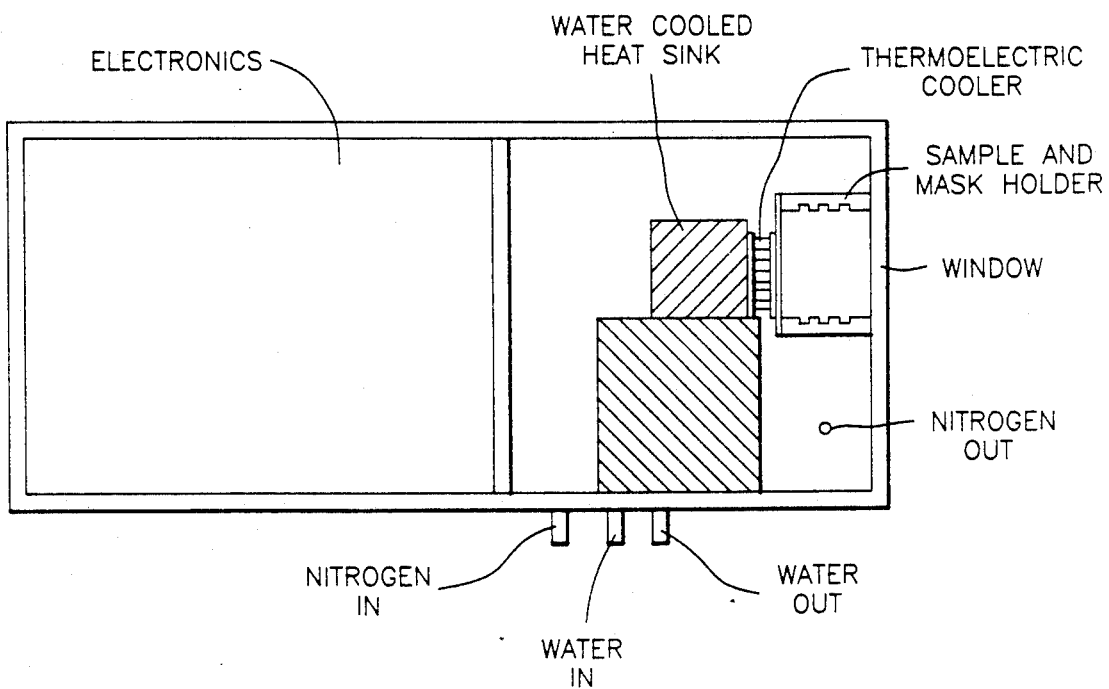
FIG. 10 is a schematic representation of an experimental measuring system.

To test the characteristics of these films in a neural network simulation we made a four synapse matrix and measured the output to the neurons for different combinations of memories. The simple system we used for these tests is shown in FIGS. 9A and 9B. In, these figures can be seen four oriented and borate buffered purple bR pixels which are sandwiched between two sets of orthogonal electrodes. The two horizontal electrodes of the same polarity are made of conducting glass with electrical isolation between them which is seen as a horizontal line in the picture. These electrodes are the input to the nurons. The complimentary electrodes on the far side of the film are platinum foils. This system of electrode sandwiched pixels is inserted into a thermoelectric cooling system with temperature control. The whole system is inserted into an air tight box which is filled with nitrogen gas in order to avoid condensation effects. The measuring system is shown schematically in FIG. 10. The bR containing purple membrane samples were produced by the usual procedures and dried oriented membranes on conducting glass with a thickness of a few microns were prepared by the procedure of Varo (6). We added a solution of borate buffer adjusted to pH 10 in order to produce the stabilized M intermediate.

Observed Photocurrents in Closed and Open Loop Circuits

A vital element of the electrooptical characteristics of bR that has to be defined in order to develop the neural network architecture described above are the open and closed loop photocurrents observed from films of bR. In FIG. 11 the behavior of a single synapse is shown. Peak A is photocurrent produced from this synapse in a regular closed loop whereas peak B is the observed signal which arises from the same synapse disconnected from the circuit by a switch. This is like connecting the synapse in series to a large resistor. The current in this case is $V/(Rm+R)$ where R is the high external resistance. In the case of DC photocurrent the photocurrent is insignificant because generally $R>>Rm$, but for pulse excitation this is not necessarily true because the switch capacitance induces a small impedance and allows the photocurrent to be developed. This means that a low capacitance switch should be used.

Observed Photocurrent of a bR Synapse in Series with a Diode

Figure 12A:
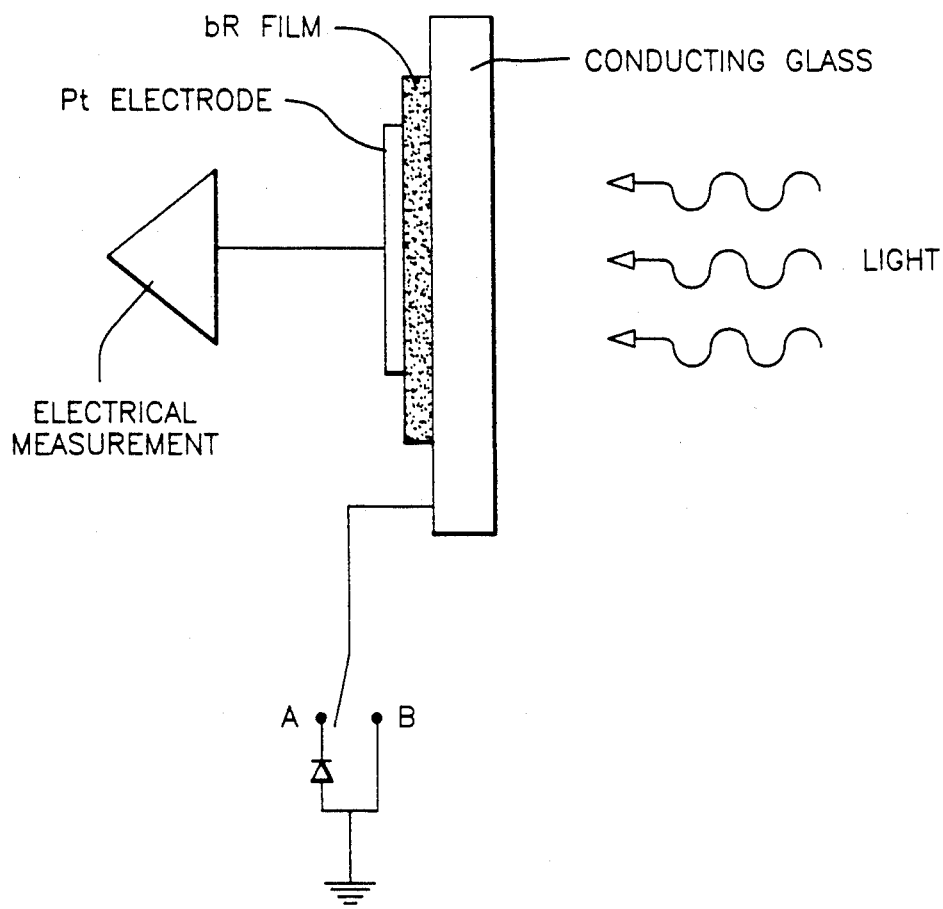
FIG. 12A is a schematic diagram illustrating a photocurrent experiment using diodes in serial opposite connections.

An additional vital element to our architecture is the observation of the photocurrent arising from a bR synapse connected to either one of two diodes with opposite polarities. The schematic of this experiment is described in FIG. 12 along with the results. Peak A corresponds to connection A where the diode is acting like a big resistor which reduces the photoeffect. On the other hand peak B corresponds to connection B where the diode is not interfering with the current flow. The diode used was Fairchild Electronics model number FJT1100 which is an ultra low leakage diode (1 picoamp). Even such ultralow leakage diodes still give a detectable current when they are connected in the revers orientation (peak A). As will be noted below such current leakage has to be further reduced in order to perform neural network computations.

The Read and Write Process

Reading Without Erasing

Figure 13:
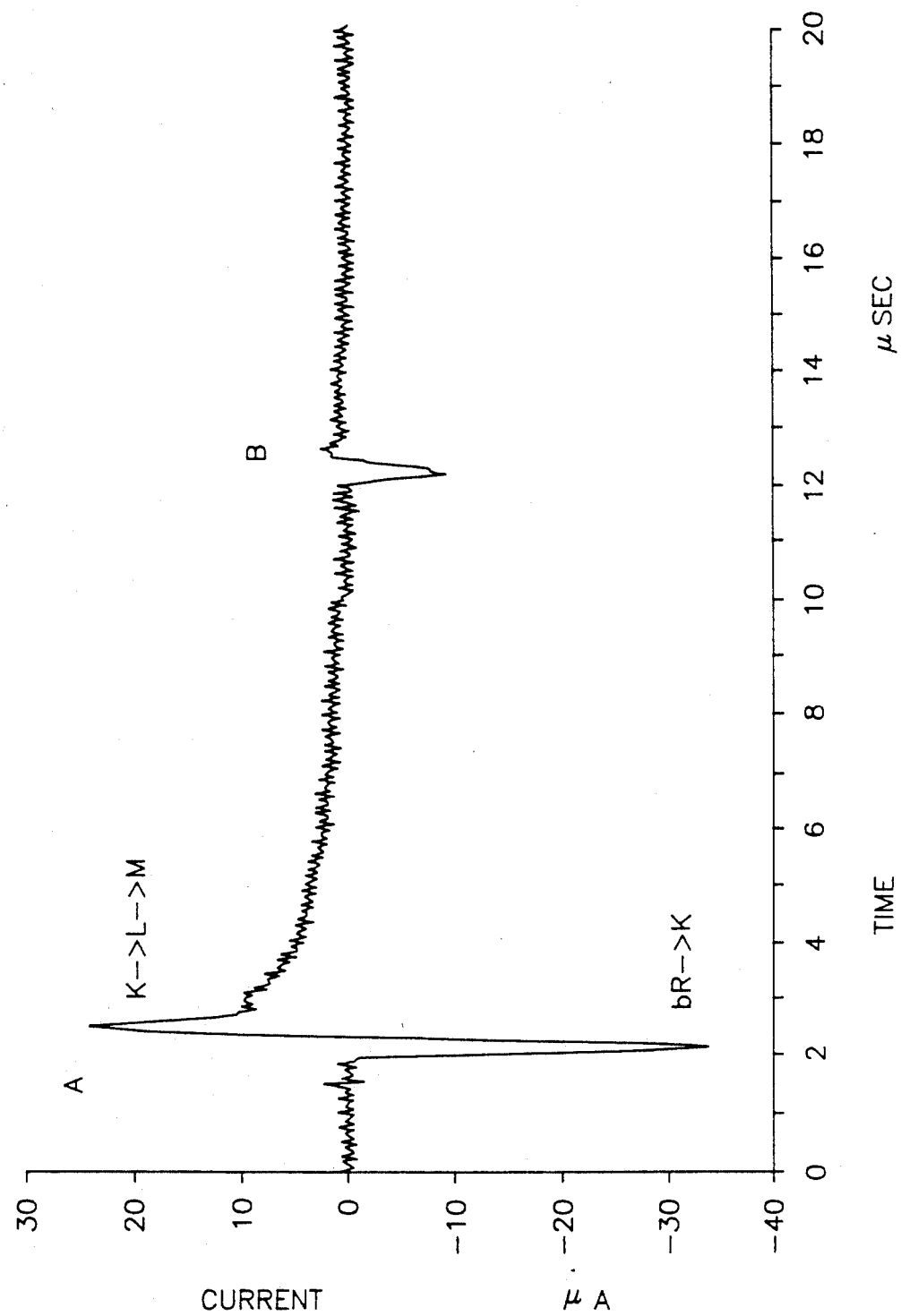
FIG. 13 graphically illustrates the photocurrent response of a pixel in accordance with the present invention.

To demonstrate this approach to reading without erasure it is first necessary to explain to the photoelectrical signal that is generated by short pulse excitation. In the previous figures that considered photoelectrical signals the excitation that was used was essentially continuous (a one second pulse was used). Thus, in these signals we were only able to detect the photoelectrical effects connected with the rise of M. With short pulsed excitation the charge transitions associated with the early intermediates of the bR photocycle also appear if appropriate electronics are used in the detecting circuit. The rapid electrical events induced by 570 nm short pulse excitation are seen in FIG. 13. In FIG. 13A a pixel with all the molecules in the bR state is excited. The negative charge transition seen in this Figure is predominantly connected with the bR→K transition while the positive peak contains contributions from K→L→M. In FIG. 13B the same excitation is involved but initially all the molecules in the pixel are in M and thus essentially no signal is evoked.

With this introduction to the electrical signals elicited by short pulse excitation the read without erasure experiments can be presented. In FIG. 14a, series of photocurrent recording are displayed. These photocurrents are stimulated by a 350 ns red pulse marked R and a 350 ns yellow pulse marked Y. In this series pulses are timed-delayed relative to each other. In the first recording the R pulse arrives about 3 $\mu$secs before the Y pulse. The Y pulse which is absorbed by the bR produces first a negative and then a positive photocurrent. The positive photocurrent then slowly decays to M. In the second recording the R pulse still arrives before Y and Y stimulates the same sequence of electrical events that represent the bR photocycle. Finally, in the third photocurrent recording the R pulse arrives 300 nsecs after the Y. Notice that in this sequence the slow positive decay in the photocurrent to M is abolished and a strong, fast positive signal which is shorter in time appears. This fast positive signal represents the K to bR back reaction which is the essence of the "read without erase" method. The strength os this reverse reaction indicates that most of the K molecules have been captured by the red pulse and switched back to bR. In the subsequent recordings of photocurrent the effect of delaying the R pulse to longer times is measured. This allows the viewing of both the fast and slow transitions superimposed.

Cross-Talk

Figure 15A:
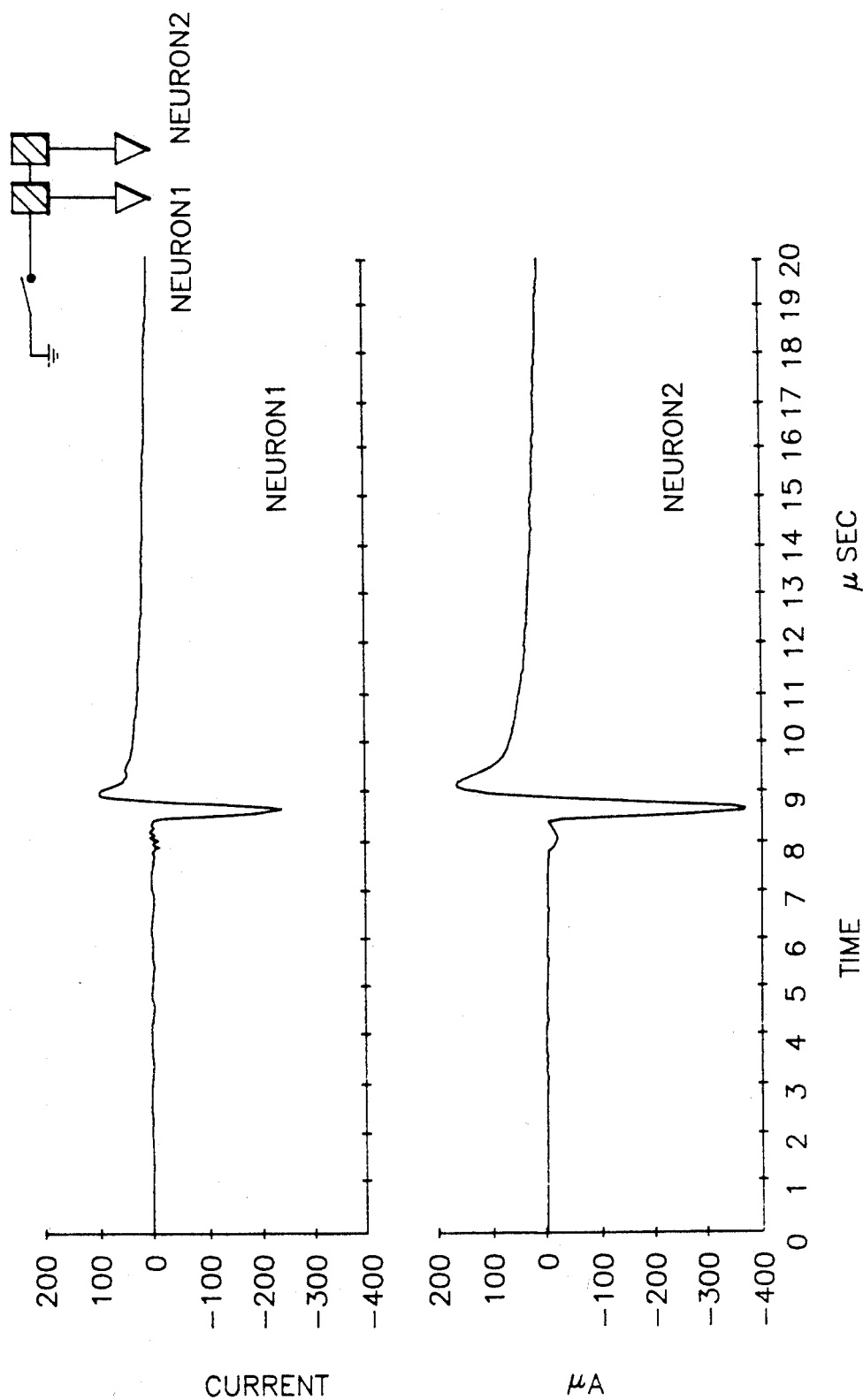
FIGS. 15A-15D graphically illustrate the photocurrent response of two synapses connected to two neurons.
Figure 15B:
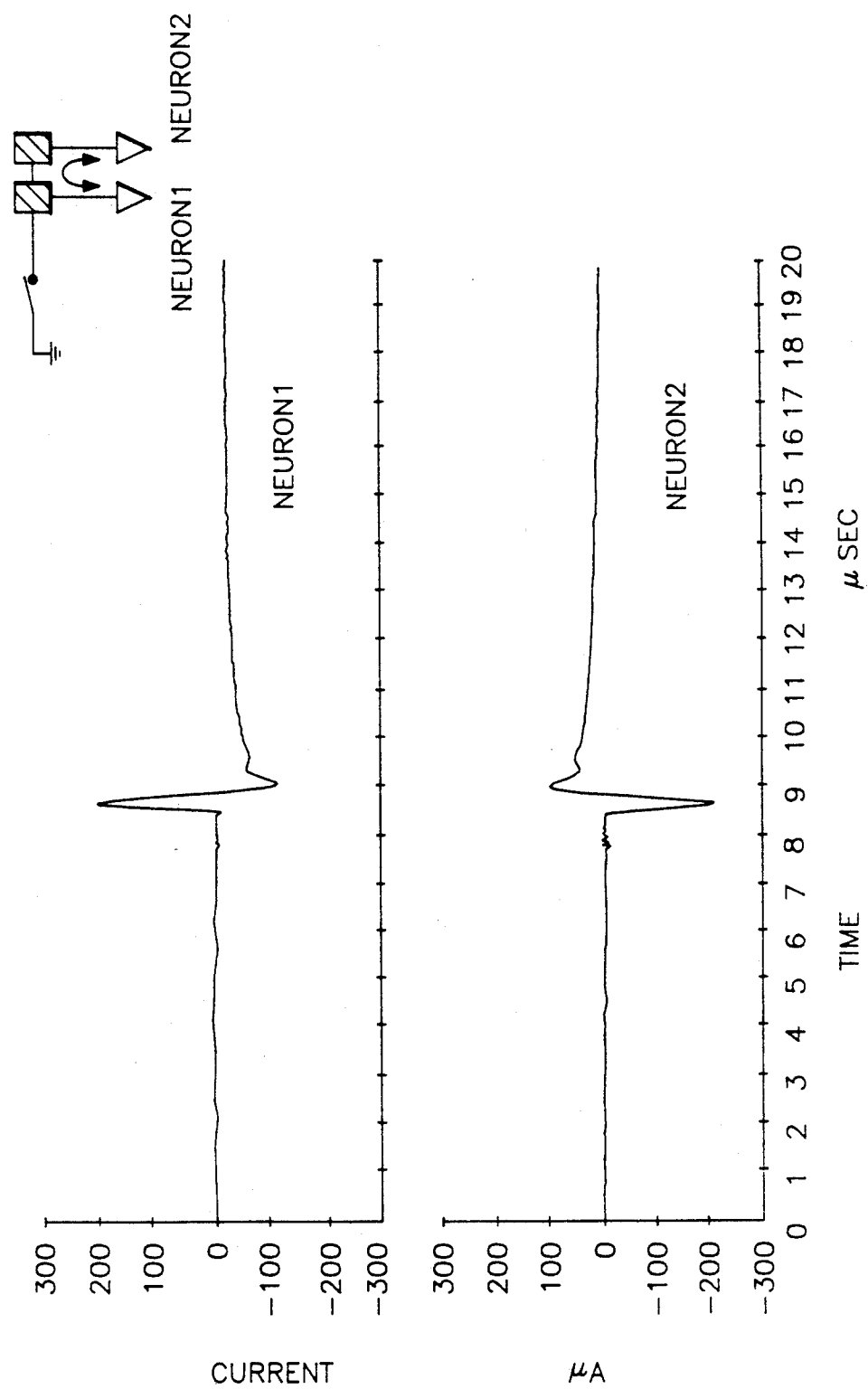
Figure 15C:
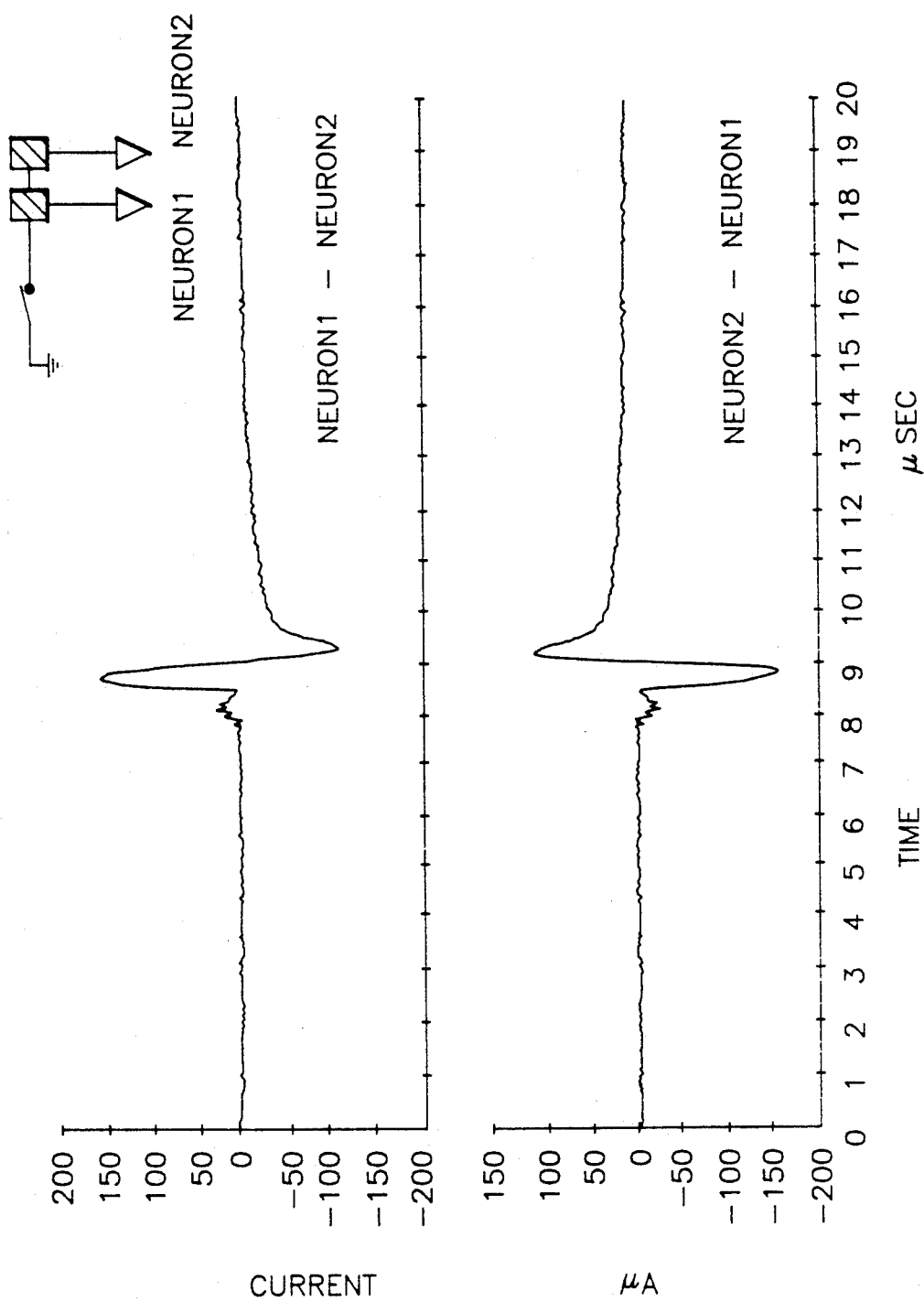
Figure 15D:
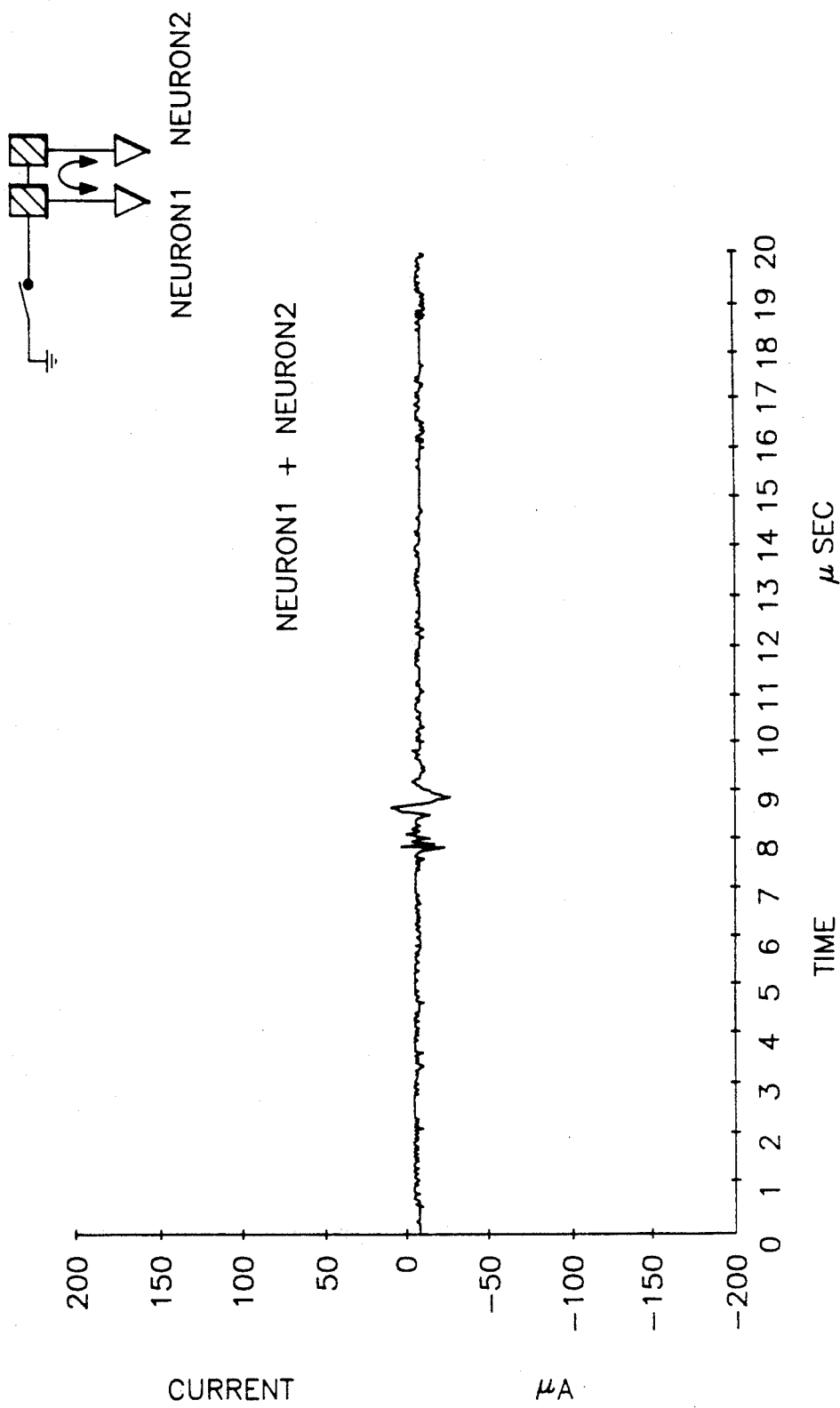

Since the reduction in the cross-talk is an important characteristic of the bR neural network architecture, a test was performed to determine the magnitude of the difficulty that this cross-talk causes. The experiment was conducted by measuring the photocurrent in two neurons connected to two synapses. FIG. 15a discribs the photocurrent in each neuron when the switch is closed. Opening the switch, In FIG. 15b, results in a deferent photocurrent reading in these neurons. In order to understand this result we conducted simple analysis shown in FIGS. 15c and 15d. In FIG. 15c the photocurrent in neuron 1 is subtracted from the photocurrent in neuron 2 and in FIG. 15d the photocurrent reading in the two neurons 1 is summed up when the switch is open. The resulting photocurrent is practically zero. The readings (neuron 1-neuron 2) and (neuron 2-neuron 1) in FIG. 15c resembles the readings neuron 1 and neuron 2 described in FIG. 15b respectively. These results prove that the photocurrent developed in a synapse in open circuit runs through the other synapse and the overall current reading in this neuron is the subtraction of the two photocurrents.

Figure 16A:
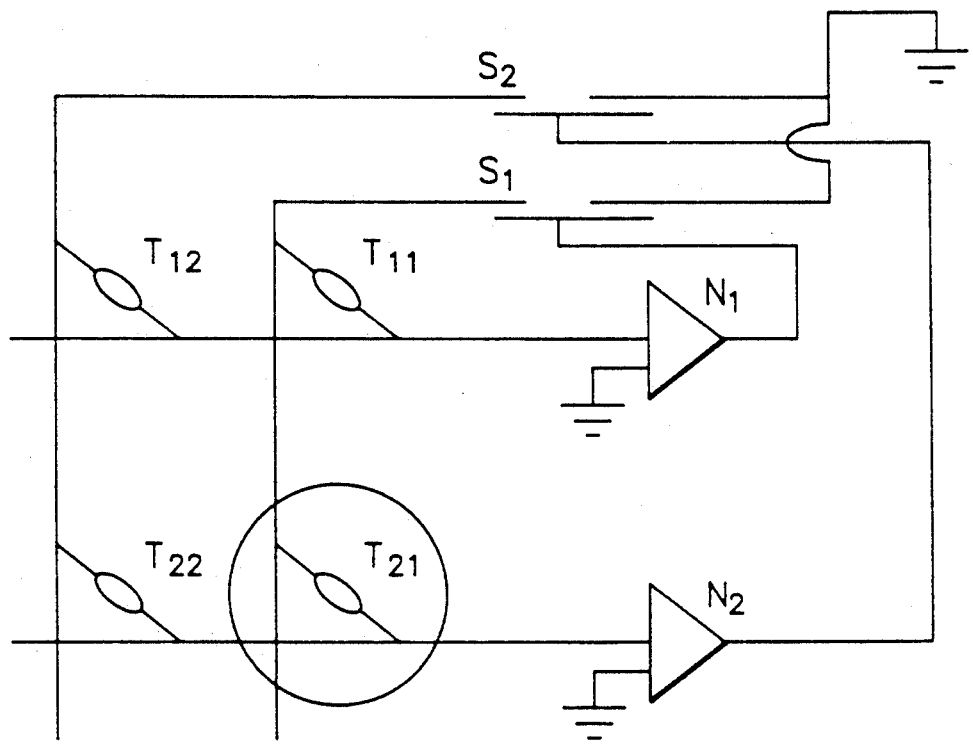
FIGS. 16A and 16B are schematic diagrams of a four synapse matrix where each matrix is connected in parallel to FJT1100 diodes.
Figure 16B:
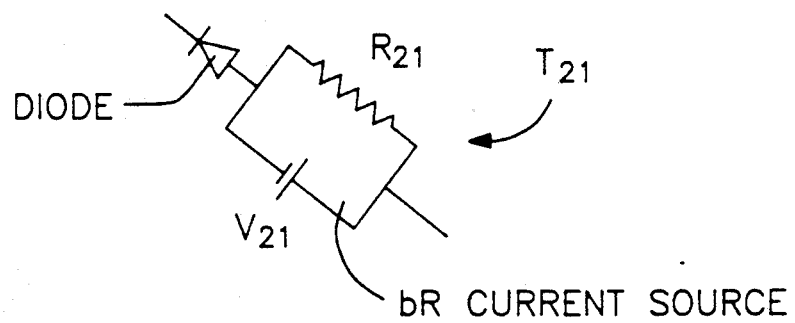
Figure 17:
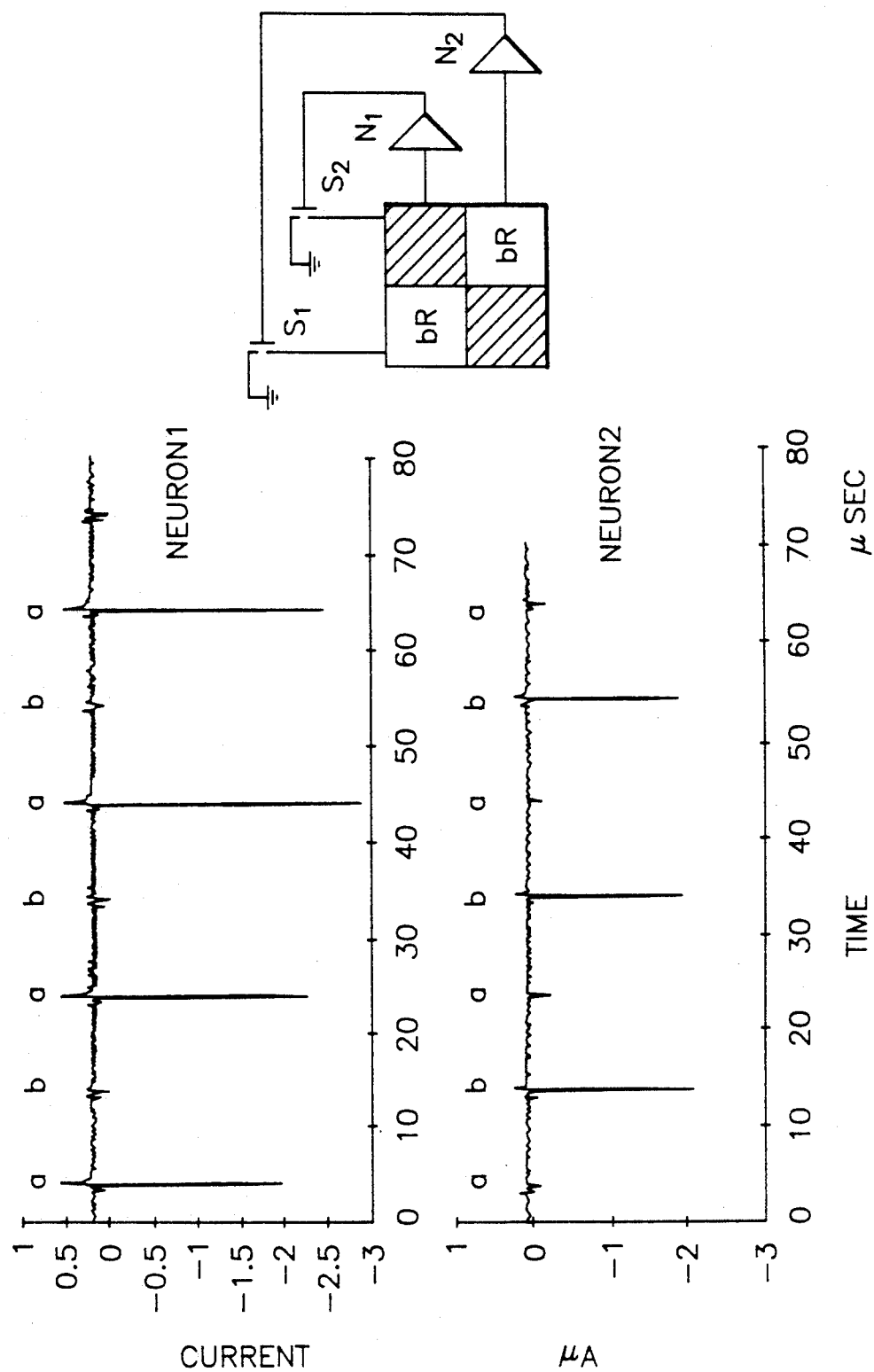
FIG. 17 graphically illustrates a photocurrent which results from a four synapse matrix where each matrix is connected in parallel to FJT1100 diodes.

To solve the cross-talk each synapse was connected to a diode which prevents the current developed in these synapses, in open circuit, to leak through each other. In order to test this, the four pixel synapse described in FIGS. 9A and 9B was used. FIG. 15 describes the connections of each of these four pixels to FJT1100 diodes. In this experiment we blocked the light from two opposite synapses instead of switching the molecules in these synapses to M. This is done in order to limit the noise to cross-talk and switch leakage and to avoid noise coming from the remaining bR molecules in the M synapse to develop bR→M noise during the 570 nm excitation. Thus, the synaptic strength is as follows: T12=1(bR), T11=0(blocked), T21=bR(1), T22=0(blocked). FIGS. 16A and 16B describe the experimental result. In this experiment Peak a obtained when S1=1(on) and S2=0(off). In this case the photocurrent in neuron 1 is T12*S1+T11*S2=1*1+0*0=1 and the photocurrent in neuron 2 is T22*S1+T21*S2=0*1+1*0=0. Peak b was obtained when S1=0(off), S2=1(on). In this case the photocurrent in neuron 1 is T12*S1+T11*S2=1*0+0*1=0 and the photocurrent in neuron 2 is T22*S1+T21*S2=0*0+1*1=1. These results shows that the cross-talk problem is resolved by connecting each synapse to a diode and it is reasonable to belief that by improving the switch and diode electrical properties the remaining low noise can be totally eliminated. In this experiment we connected S1 and S2 in all the possible combinations.

Observed Transition Times

This section refers to the CW (about 1 second) excitation. It can be seen that although the time constant of the bR→M and M→bR transitions are ~40 μsec and ~70 nsec respectively, the observed time course of these photocurrent pulses are about 0.5 sec. There are several reasons for this lack of compatibilities. It is important to note in this regard that the integral over time of the photocurrent pulse that is generated in each synapse is proportional to the number of bR molecules that are transformed to the M intermediate in the bR→M transition. This is also the case in the M→bR transition. Thus, the height and width of the photocurrent pulse depends on the intensity and width of the exciting pulse. In other words, the faster one can stimulate bR→M transition in the synapse the higher the photocurrent pulse and the shorter its time course. The experiments used cw light to illuminate the sample so that the photocurrent pulse height and width depends only on the power of the light. The higher the power the higher the photocuurent pulse peak and shorter its time interval. This is true until the saturation point is reached. The light source used in the experiments was a 200 W cw mercury lamp and this contributed to the development of photocurrent pulses that are expanded in time and have a small peak.

In addition, the power source of the above mercury lamp was 220 V/50 Hz and thus, the light source emitted light with a 100 HZ ripple. This caused a strong ripple in the photocurrent measured. In order to reduce the ripple the photocurrent signal coming from the sample was passed through a filter which increased the RC of the system and thus further extended the pulse duration and reduced it's peak. An additional source for the extended pulse durations that are observed in the results below is the quantum yield of the bR→K transition. This yield is estimated to be between 0.3 and 0.5 in suspensions of bR at pH 8. This low yield means that it takes more time even with saturated light to convert all molecules from bR to M. The problem of the photochemical quantum yield can be found also in other intermediate transitions which expand the over all time scale of these respective transitions. This difficultly should not be evident in the use of the bR to K photocurrent.

REFERENCES

1. J.J. Hopfield; Proc. Nat. Acad. Sci. USA 79,2554 (1982).
2. J.J. Hopfield and D.W. Tank; Biol. Cybern. 52,141 (1985).
3. E.A. Rietman, R.C. Frye, C.C. Wong, C.D. Kornfield: Applied Optics (1988).
4. A.P. Thankoor, A. Moopenn, J. Lambe, S.K. Khanna: Applied Optics Vol.26,No.23 5085 (1987).
5. L.D. Jackel, H.P. Graf, R.E. Howard: Applied Optics Vol.26,No.23 5077 (1987).
6. Varo'. G.; Acta Biol. Acad. Sci. Hung. 32 301 (1982).

Figure 1:
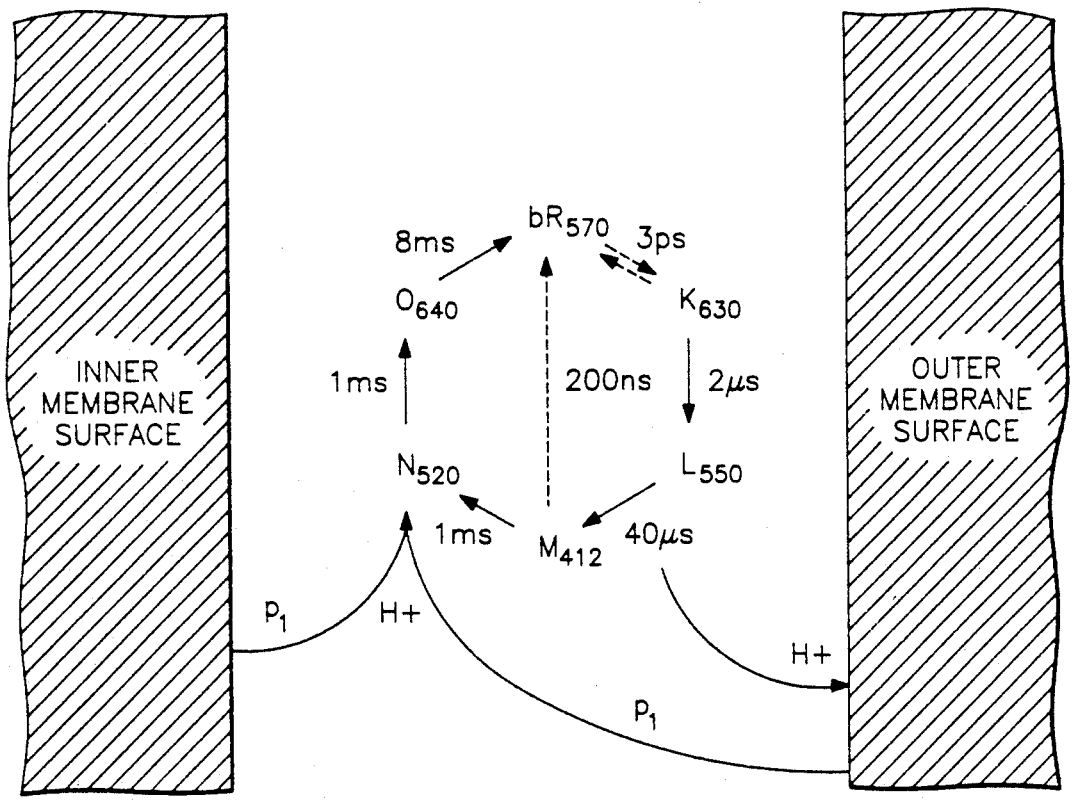
FIG. 1 illustrates the bacteriorhodopsin photocycle.

The following is a further description of some of the Figures:

FIG. 1. The bacteriorhodopsin photocycle with respect to the inner and outer membrane surfaces of the purple membrane (respectively, the side of the membrane that points to the inside of the cell and the side of the membrane that faces the solution in which the whole bacterium lives). In the photocycle shown solid thick lined arrows represent thermal decay of species and wiggly arrows represent photochemical processes. The bacteriorhodopsin molecule is embedded vectorially in the purple membrane and as a function of the transformation induced by light it ejects a proton to the outer side in the bR to M transformation and takes up a proton in the M to bR in the regeneration process. In wet membranes these protons are pumped from the inside (the p1 pathway shown as a thin lined arrow) to the outside. However in the dried membranes with borate buffer that we have used in the experiments reported in this invention the proton uptake pathway is represented by p2 in the figure. This results in electrical properties with a reverse polarity in the reactions that regenerate bR in dried membranes.

Figure 2:
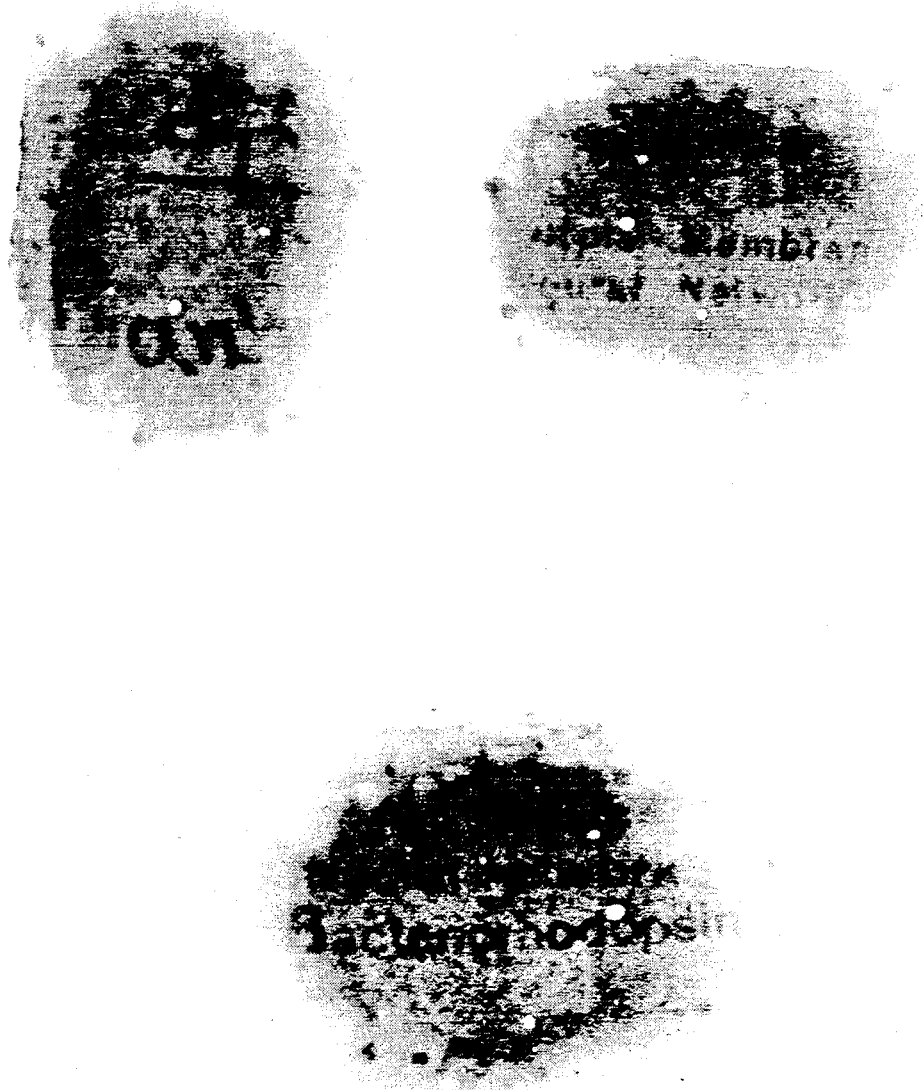
FIG. 2 illustrates three different images impressed on the same film of dried bacteriorhodopsin (bR).

FIG. 2. Three different images impressed on the same film of dried bR. These images were photographed ≈10 secs after they were impressed on the bR. The photography required four light sources which themselves bleached the film and reduced the contrast of the images. The thicknesses of the lines used to produce the letters is ~0.1 mm. The purple membrane/bR medium is expected to be an ultra-high resolution film since the photochemical reaction producing the image is ultimately determined by photon absorption by a single bR molecule.

FIG. 3A bR/M and M/bR photocurrent measured such that the bR to M transition is movement of charge towards the glass electrode and the M to bR transition is charge movement towards an opposite polarity platinum electrode.

FIG. 3B. The same as in 3A with cooling.

FIG. 4. The photochemical steps in the "read without erase" procedure. A Depicts the initial state where all the molecules are in the bR state. B Describes the writing step where some molecules are brought to state M, C. portrays the reading step where a fraction of the remaining molecules in the bR state are photochemically changed from bR to K. The magnitude of the photocurrent developed during the reading step depends on the amount of molecules that were transfered to state M during the writing step. Thus, this process of read without erase produces a reprogammable pulse of photocurrent 2.

Figure 5:
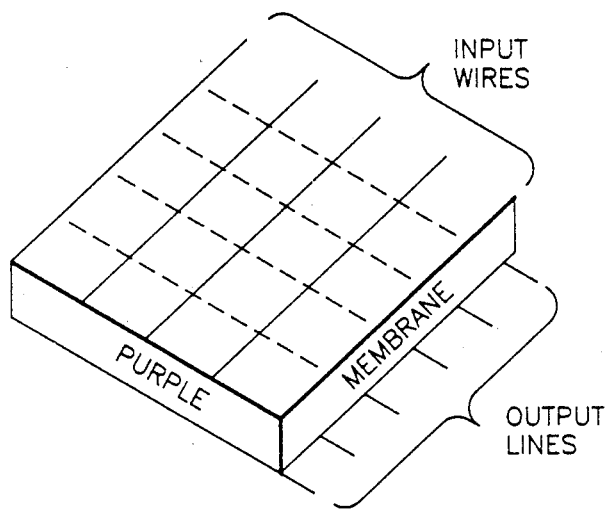
FIG. 5 illustrates a grid arrangement of synapses in accordance with the present invention.

FIG. 5. Visualization of the grid concept with bacteriorhodopsin containing purple membrane that is used for the synapse matrix. The active material is sandwiched between two orthogonal sets of gratings.

Figure 12B:
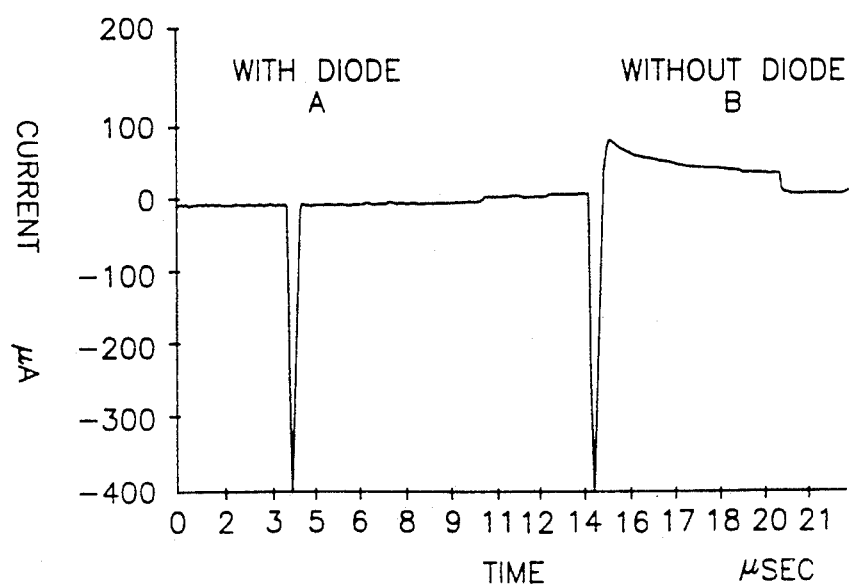
FIG. 12B is a graphic representation of photocurrents measured during the experiment of FIG. 12A.

FIG. 12B. Results from experiments that measured the photocurrent with diodes in the two opposite connections shown in 12A. Peak "A" corresponds to connection "A" in 12A and peak "B" corresponds to connection "B".

FIG. 13. The photocurrent response of a bR pixel excited by 350 ns, 570 nm pulse in which (A) all the molecules are in the bR state and (B) all the molecules are in the M state.

FIG. 14. The read without erase experiment. Each 20 μsec time interval corresponds to the photocurrent response of a bR pixel excited by two time delayed red and yellow pulses. In each sets of pulses the time delay was varied. The third set shows the read without erase effect where all the K molecules are transfered back to the bR state.

FIG. 15: Photocurrent response of two synapses connected to two neutrons. (a) The switch is closed and no cross talk appears. (b) The switch is open and cross talk appears. (c) The switch is closed and the responses are subtracted from each other (neuron 1-neuron 2) and (neuron 2-neuron 1). The resulting responses are similar to those in experiment (b). (d) The switch is open and the responses are added. This shows that the responses in the neurons are opposite to each other.

We claim:

1. A neural network comprising a plurality of neurons, synapses and switches, which synapses comprise a substance X which can be transferred by illuminating it at a given wavelength from stable State A to stable State B, which change is reversible, and which substance can be transferred from State A to State C which differs from State B, which is also reversible, each such change providing an electrically measurable pulse, said components being interconnected for data storage and retrieval in parallel or serially, wherein said data storage is achieved in individual synapses by selectively illuminating said substance X at said given wavelength to thereby change part of said substance X to stable State B.

2. A network according to claim 1, and further comprising reading means for transforming the rest of the substance to State C and back to State A, resulting in an electrical signal proportional to the quantity of substance X passing from A to C and back which is indicative of the quantity of substance X in State B.

3. A neural network according to claim 1, wherein the synapses are composed of a material which acts as a programmable current source.

4. A neural network according to claim 1, where the synapses are composed of a material which can be altered by means of an external energy source so that the synaptic strength can be varied at will, and can be reprogrammed by the use of this external energy source.

5. A network according to claim 1 or 2, where the active substance is bacteriorhodopsin (bR).

6. A network according to claim 1, where the active substance X is bacteriorhodopsin, where the change from A to B is from a State of bacteriorhodopsin to a State of M by 570 nm irradiation; and where the change from A to C is from the State of bacteriorhodopsin to a state of K also by 570 nm irradiation, in sequenced timing with a 680 nm pulse for reversal to the State of bacteriorhodopsin, resulting in an electric pulse indicative of the portion of substance X in the M state.

7. A network according to claim 3, comprising means for maintaining a desired temperature and a dry atmosphere.

8. A network according to claim 1, wherein said synapses are arranged in columns and rows, and further comprising operational amplifiers which act as said neurons and connect each column of synapses through one of said switches from a ground to a virtual ground, said one of said switches being connected to and selectively controlled by said operational amplifiers such that:

when the switch is closed, each synapse in a column is connected across the ground and the virtual ground so as to produce a photocurrent in the row which the synapse is located in, which photocurrent depends on the state of the synapse; and when the switch is open, the column of synapses is left in an open circuit condition such that the synapses therein cannot contribute photocurrent to the rows.

9. A network according to claim 8, wherein said rows and columns are defined by a plurality of electrodes, and wherein said substance X is microfabricated to provide pixels of bacteriorhodopsin sandwiched between the electrodes which define the columns and the electrodes which define the rows.

10. A network according to claim 9, and further comprising a photovoltage or photocurrent sensing device connected from a column of pixels to a row of pixels so as to form a two dimensional light detector.

11. A method of storing information in an artificial neural network comprising neurons, synapses, switching an rectifying means, which contains synapses containing a substance X which exists in a number of energy states, which comprises irradiating any of the synapses to convert part or all of the substance X to stable state M, converting the remaining part of X, if such exists to state K and reverting that part from K to the initial state, and measuring the electrical signal of the conversion to K and back, erasure of the information in the synapse being effected by reversing substance from M to the initial state.

12. A method according to claim 11, where the substance X is bacteriorhodopsin.

13. A method according to claim 12, where the conversion from the initial state to M is by means of irradiation in the bacteriorhodopsin absorption range; where the conversion from initial state to state K and back is by means of a two-pulse sequence with a certain time interval between the pulses where the wavelength of the first pulse is in the bacteriorhodopsin absorption and the second pulse is in the K absorption.

14. A method according to claim 11, where the neurons are updated in parallel (at the same time) and further comprising the step of rectifying currents from each of the synapses in order to eliminate cross-talk which develops through the synapse and between neurons as a result of such parallel updating.

15. A method according to claim 11, where the neurons are updated serially either by predetermined path or at random, such that no cross-talk appears.

16. A network according to claim 15, wherein said substance X is microfabricated to provide pixels of bacteriorhodopsin sandwiched between an electroluminescent or photoluminescent material and a plurality of electrodes.

17. A network according to claim 16, wherein each pixel is provided with a light source which is selectively activated during data retrieval.

18. A network according to claim 17, and further comprising means for applying appropriately timed voltages over said pixels during data storage, such that data storage can be achieved substantially in parallel.

19. A network according to claim 18, and further comprising data retrieval means for illuminating the entire network with a single light pulse to thereby produce a photovoltage at each pixel which erases part of each pixel and allows data retrieval, and means for compensating in future data retrievals for the percentage of the substance X in the pixels that has been transformed in the previous retrieval operation.

20. A network according to claim 19, and further comprising a connection between the neurons of the network and other networks for performing computational tasks.

21. A network according to claim 16, wherein said substance X comprises mutant or chemically modified protein retinal complexes.

* * * * *